Figure 1:
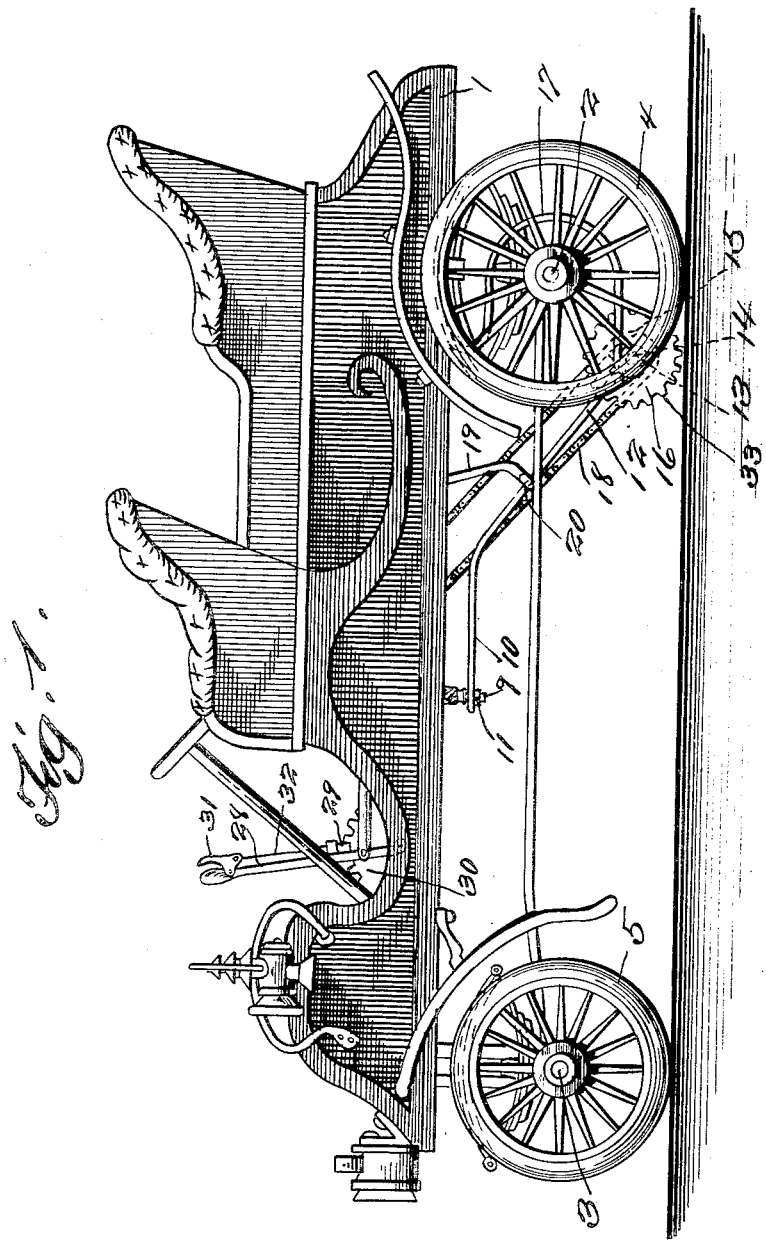

E. E. WILSON.
AUTO PROPELLER.
APPLICATION FILED AUG. 19, 1909.

941,970.

Patented Nov. 30, 1909.
2 SHEETS—SHEET 1.

Witnesses
M. M. Miller
Francis G. Boswell

Inventor
E. E. Wilson
By D. Swift & Co.
Attorneys

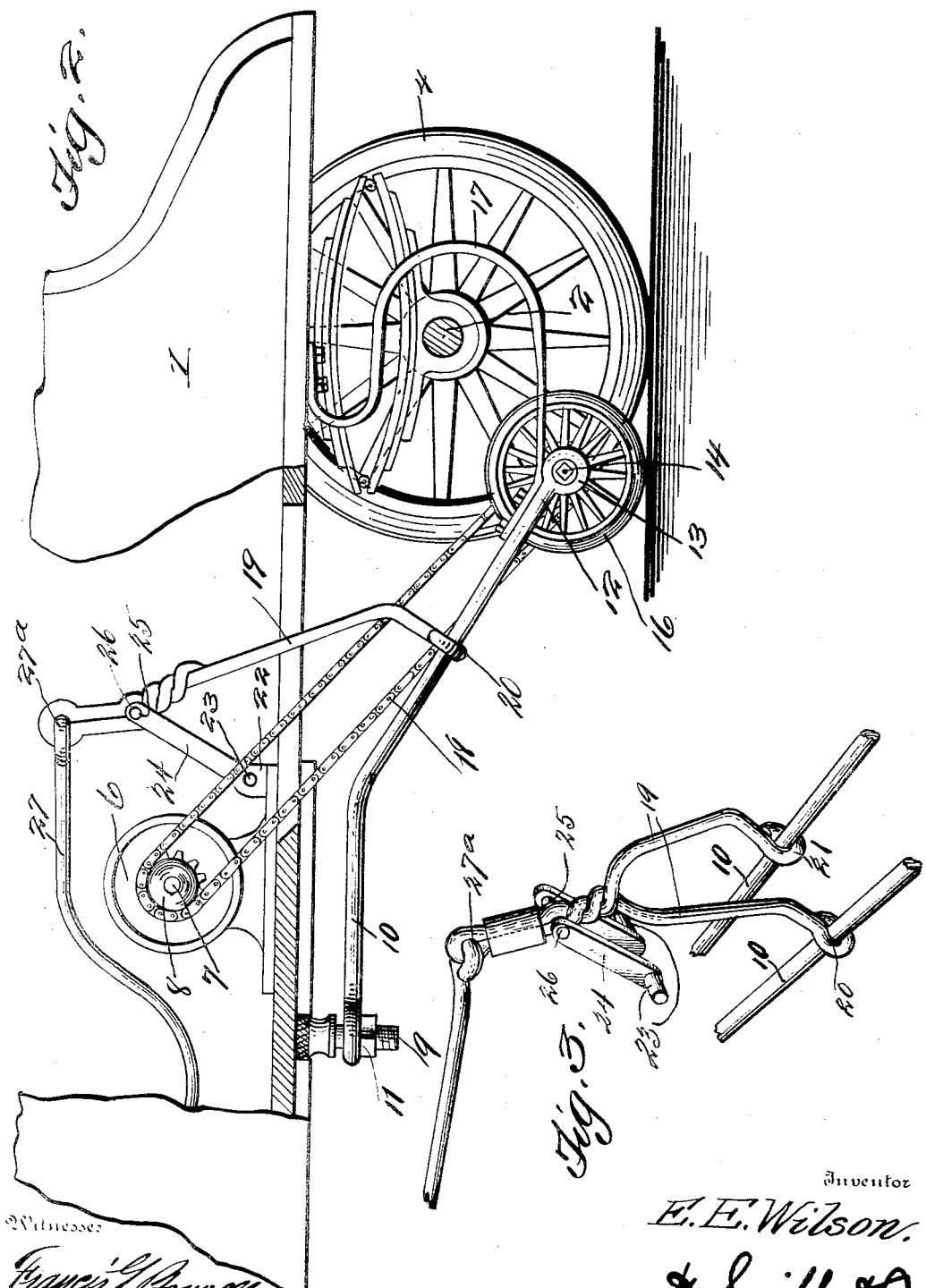

UNITED STATES PATENT OFFICE.

ELMER E. WILSON, OF SCOTTSVILLE, KANSAS.

AUTO-PROPELLER.

941,970.     Specification of Letters Patent.     Patented Nov. 30, 1909.

Application filed August 19, 1909. Serial No. 513,607.

*To all whom it may concern:*

Be it known that I, ELMER E. WILSON, a citizen of the United States, residing at Scottsville, in the county of Mitchell and State of Kansas, have invented a new and useful Auto-Propeller; and I do hereby declare the following to be a full, clear, and exact description of the invention, such as will enable others skilled in the art to which it appertains to make and use the same.

This invention pertains to a new and useful propelling apparatus, adapted principally for use in connection with automobiles or similar vehicles, and the invention in its broadest aspect has for its main object, to provide a pivoted frame having journaled therein a propeller wheel, designed for the purpose of engaging the ground in order to propel the machine forward, there being suitable springs of sufficient capacity for holding the wheel in engagement with the ground.

A further object of the invention resides in the provision of means for raising and lowering the pivoted frame, against the tension of the said springs, in order to disengage the propelling wheel from the ground.

This invention comprises further objects and combinations of elements which will be hereinafter more fully described, shown in the accompanying drawings, and the novel features thereof will be pointed out by the appended claims.

To obtain a full and correct understanding of the details of construction, combinations of features, elements and advantages, reference is to be had to the hereinafter set forth description and the accompanying drawings in connection therewith, wherein, Figure 1 is a side elevation of an automobile, showing the propelling mechanism applied thereto. Fig. 2 is a sectional view through the automobile, illustrating more clearly the means for raising and lowering the pivoted frame carrying the propelling wheel. Fig. 3 is a detail perspective view of the means for raising and lowering the pivoted frame, showing the same detached or removed from the automobile.

Referring more especially to the accompanying illustrations 1 denotes the body of an automobile, of the usual construction, and provided with the usual running gear, comprising the rear and forward axles 2 and 3, upon which the ordinary wheels 4 and 5 are journaled.

6 represents the usual motor for generating power for the automobile, having a suitable drive shaft 7, upon which a sprocket wheel 8 is journaled. The motor forms no part of the present invention, therefore the same is not described in detail.

The running gear has projecting downwardly therefrom a stud 9 upon which the frame 10 has a swiveled connection, as clearly shown in the drawings, there being a suitable member 11 threaded upon the stud in order to regulate the swiveled action of said frame. The lower swinging, free end 12 of the frame is provided with bearings 13, in which a suitable shaft 14 is journaled. Rotatable with the shaft 14 are sprocket and propelling wheels 15 and 16, as clearly shown in the drawings. Interposed between the frame of the automobile and the lower free end of the pivoted frame are suitable springs 17, the purpose of which is to hold the pivoted frame downward, thereby holding the propelling wheel yieldably in contact with the ground, in order to allow the same to readily pass over the irregularities of the ground. In order to transmit power from the motor, a suitable sprocket chain 18 is provided, which passes about the sprockets 8 and 15, as shown clearly in Fig. 2.

In order to raise and lower the pivoted frame, an inverted Y-shaped frame 19 is provided, the lower projections of which are pivoted to the pivoted frame, as at 20 and 21. Journaled in suitable bearings 22 and 23 of the frame of the automobile is an inverted U-shaped member 24, the transverse portion 25 of which has a pivotal connection as at 26 with the inverted Y-shaped frame. The inverted Y-shaped frame is extended above the transverse portion 25 of the inverted U-shaped member and pivoted to it is one end of the connecting rod 27, the other end 27ᵃ of which is pivoted to a lever 28, as clearly shown in Fig. 1. This lever 28 is provided with a spring tensioned dog or bolt 29, which coöperates with one or another of the teeth of the quadrant 30, and is manipulated through the medium of the hand grip and connecting rod 31 and 32.

It will be readily manifest that by moving the lever 28 forward, the pivoted frame will be raised, through the medium of the connecting rod, the U-shaped member, and the inverted Y-shaped frame. The spring tensioned dog or bolt is designed for the purpose of holding the lever 28 in its various adjusted positions. The propelling wheel 16 may be provided with spikes or projections 33 about its periphery, or if desired the said wheel may be provided with a rubber tire, in order to properly engage the ground for the purpose of propelling the machine forward. From the foregoing, the essential features, elements and the operation of the device together with the simplicity thereof, will be clearly apparent.

Having thus fully described the invention, what is claimed as new and useful is:—

1. In an automobile propeller, a pivoted frame having a propelling wheel, means for transmitting motion thereto, an inverted Y-shaped frame having a connection with the pivoted frame and provided with a movable fulcrum, and means for manipulating the inverted Y-shaped frame in order to raise the pivoted frame.

2. In an automobile propeller, a pivoted frame having a propelling wheel, means for holding the pivoted frame downwardly to cause the propelling wheel to contact yieldably with the ground, means for transmitting power to the propelling wheel, an inverted Y-shaped frame having a connection with the pivoted frame and provided with a movable fulcrum, and means for manipulating the inverted Y-shaped frame in order to raise the pivoted frame.

3. In an automobile propeller, a swiveled frame having a propelling wheel, means for regulating swiveled action of the frame, means for holding the swiveled frame downwardly to cause the propelling wheel to contact yieldably with the ground, means for transmitting power to the propelling wheel, an inverted Y-shaped frame having a connection with the swiveled frame and provided with a movable fulcrum, and means for manipulating the inverted Y-shaped frame in order to raise the swiveled frame.

4. In an automobile propeller, a swiveled frame having a propelling wheel, means for regulating swiveled action of the frame, means for holding the swiveled frame downwardly to cause the propelling wheel to contact yieldably with the ground, means for transmitting power to the propelling wheel, an inverted Y-shaped frame having a connection with the swiveled frame, an inverted U-shaped pivoted member forming a fulcrum for the inverted Y-shaped frame, and means for manipulating the inverted Y-shaped frame in order to raise the swiveled frame.

5. In an automobile propeller, a swiveled frame having a propelling wheel, means for transmitting power thereto, an inverted Y-shaped frame having a connection with the swiveled frame, an inverted U-shaped member forming a movable fulcrum for the Y-shaped frame, and means for manipulating the Y-shaped frame in order to raise the swiveled frame.

In testimony whereof I have signed my name to this specification in the presence of two subscribing witnesses.

ELMER E. WILSON.

Witnesses:
E. T. BURGAN,
WILLIS LAUNSBURY.